(12) United States Patent
Hainsworth et al.

(10) Patent No.: US 8,886,587 B1
(45) Date of Patent: Nov. 11, 2014

(54) MODEL DEVELOPMENT AND EVALUATION

(75) Inventors: John Hainsworth, Pittsburgh, PA (US);
Michael Pohl, Pittsburgh, PA (US);
David W. Sculley, II, Pittsburgh, PA (US); Yan Tang, Pittsburgh, PA (US);
Sophia Lin, Saratoga, CA (US);
Alexander Felker, Schwesswitz (DE);
Yunkai Zhou, Sewickley, PA (US);
Narayana R. Tummala, Gibsonia, PA (US)

(73) Assignee: Google Inc., Mountain View, CA (US)

( * ) Notice: Subject to any disclaimer, the term of this patent is extended or adjusted under 35 U.S.C. 154(b) by 361 days.

(21) Appl. No.: 13/162,909

(22) Filed: Jun. 17, 2011

Related U.S. Application Data

(60) Provisional application No. 61/470,755, filed on Apr. 1, 2011.

(51) Int. Cl.
*G06N 5/04* (2006.01)
(52) U.S. Cl.
USPC .................. 706/47; 706/46; 706/48; 706/59

(58) Field of Classification Search
USPC .......................................................... 706/47
See application file for complete search history.

(56) References Cited

U.S. PATENT DOCUMENTS 7,367,006 B1 * 4/2008 O'Riordan et al. ........... 716/102

* cited by examiner

*Primary Examiner* — Jeffrey A Gaffin
*Assistant Examiner* — Nathan Brown, Jr.
(74) *Attorney, Agent, or Firm* — Fish & Richardson P.C.

(57) ABSTRACT

Methods, systems, and apparatus, including computer programs encoded on a computer storage medium, for managing decision models. In one aspect, a method includes providing data that cause presentation of a model development user interface receiving first model rule data through the user interface. The first model rule data specify a first characteristic of a violating resource and a threshold score for the first characteristic. Additional model rule data are received through the user interface. The additional model rule data specify one or more additional model rules. Relationship data are received through the user interface for each of the additional model rules. The relationship data specify sets of the additional model rules that violating resources satisfy. Data that cause a hierarchical presentation of the first model rule and the additional model rules are provided.

18 Claims, 5 Drawing Sheets

MODEL DEVELOPMENT AND EVALUATION

CROSS-REFERENCE TO RELATED APPLICATIONS

This application claims the benefit under 35 U.S.C. §119(e) of U.S. Patent Application No. 61/470,755, entitled "MODEL DEVELOPMENT AND EVALUATION," filed Apr. 1, 2011, which is incorporated herein by reference in its entirety.

BACKGROUND

This specification describes technologies relating to data processing and model development.

The Internet provides access to a wide variety of resources. For example, video and/or audio files, as well as search results pages and web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

When a web page (or another resource) is requested by a user, an advertisement request is generated and transmitted to an advertisement management system that selects advertisements for presentation in the advertisement slots. The advertisement management system selects advertisements, for example, based on characteristics of the web page with which the advertisements will be presented, demographic information about the user to whom the advertisements will be presented, and/or other information about the environment in which the advertisement will be presented.

The advertisements that are provided in response to an advertisement request can be required (e.g., according to terms of use) to comply with a set of advertising guidelines. These advertising guidelines may specify, for example, content that can be included in advertisements and/or content that cannot be included in the advertisements. An example advertisement guideline may specify that an advertisement cannot include misleading or inaccurate claims. For example, an advertisement that claims that a user can make $500,000 a year by simply sending the advertiser $50 is likely to be in violation of the advertising guidelines.

Generally, advertising effectiveness and/or user satisfaction increases when the quantity of violating advertisements (i.e., advertisements that violate the advertising guidelines) is limited. Classification models can be used to identify violating advertisements (i.e., advertisements that violate one or more of the advertising guidelines), for example, based on characteristics of the advertisement and/or the resource (e.g., web page) to which users are redirected following interaction with the advertisement. Manually creating these models can be difficult and time consuming.

SUMMARY

In general, one innovative aspect of the subject matter described in this specification can be embodied in methods that include the actions of providing data that cause presentation of a model development user interface; receiving first model rule data through the user interface, the first model rule data specifying a first model rule that specifies a first characteristic of a violating resource and a threshold score for the first characteristic; receiving additional model rule data through the user interface, the additional model rule data specifying one or more additional model rules, each of the additional model rules specifying an additional characteristic of the violating resource and an additional threshold for the additional characteristic; receiving, for each of the additional model rules, relationship data through the user interface, the relationship data specifying sets of the additional model rules that violating resources satisfy; and providing data that cause a hierarchical presentation of the first model rule and the additional model rules, the first model rule being presented at a highest hierarchical position and each of the additional model rules being presented at a descendent hierarchical position based on the relationship data, the data further causing presentation of a relationship indicator for each of the additional model rules, the relationship indicator specifying the sets of additional model rules that must be satisfied to classify a resource as a violating resource. Other embodiments of this aspect include corresponding systems, apparatus, and computer programs, configured to perform the actions of the methods, encoded on computer storage devices.

These and other embodiments can each optionally include one or more of the following features. Methods can further include one or more of the actions of receiving additional model rule data comprises receiving additional model rule data that specify one or more rule subsets that each include two or more different model rules; receiving relationship data comprises receiving, for each rule subset, relationship data specifying a set of the two or more different model rules in the rule subset that are satisfied by the violating resource; and providing data that cause presentation of the first model rule and the additional model rules comprises providing data that cause presentation of each rule subset and a relationship indicator for the model rules in the rule subset, the relationship indicator specifying combinations of the model rules in the rule subset that must be satisfied to classify a resource as a violating resource.

Providing data that cause presentation of each rule subset can include providing data that cause presentation of a subset indicator that visually delineates each rule subset from other rule subsets. Providing data that cause presentation of each rule subset can include, for each rule subset, providing data that cause presentation of the rule subset at a hierarchical presentation position that indicates hierarchical relationships between the rule subset and other rule subsets, satisfaction of each rule subset being based, in part, on satisfaction of one or more other rule subsets that are hierarchical descendants of the rule subset.

Receiving first model rule data comprises receiving first model rule data specifying a phrase and a threshold number of the phrase that, when included in resource, are indicative of the resource being a violating resource. Receiving additional model rule data can include receiving additional model rule data that specify a network location for a resource.

Method can further include one or more of the actions of receiving a model evaluation request requesting that a model that is defined by the first model rule and the additional model rules be used to classify a set of resources; in response to receiving the model evaluation request, classifying the set of resources; generating an impact list that specifies resources from the set of resources that were classified by the model as violating resources; and providing data that cause presentation of resource identifiers for the resources that were classified as violating resources.

Methods can further include the action of receiving approval data through the user interface, the approval data specifying that the model has been approved to classify resources.

Receiving first model rule data that specify a threshold score for the first characteristic can further include receiving a cumulative rule score that specifies a maximum cumulative score of a non-violating resource, the cumulative for a resource being determined based on the set of the additional model rules that is met by the resource.

Particular embodiments of the subject matter described in this specification can be implemented so as to realize one or more of the following advantages. Models can be created, modified, and/or analyzed without knowledge of the syntax or formatting with which models are specified for use by computers. Graphical representations of models provide visual indications of hierarchical relationships between model rules that define a decision model. Models can be tested prior to approval in order to reduce the likelihood that resources will be misclassified by the models.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Graphical representations of decision models are presented in a user interface. The graphical representations can be arranged in a hierarchical manner that is visually indicative of the relative hierarchical relationships between model rules that are used to implement the models. For example, a first model rule that must be satisfied irrespective of whether any other model rules are satisfied can be presented at a highest hierarchical position, while additional model rules (e.g., sub-rules) for the first model rule can be presented at lower hierarchical positions. The position at which each additional rule is presented is selected based on the whether the additional rule is directly related (e.g., by way of a logical operator) to the first model rule or whether the additional rule is a sub-rule of another additional rule or rule subset, as described in more detail below. The ability to graphically represent the model enables users of various skill levels to generate, modify, and analyze decision models, even if the users are not familiar with the syntax or formatting that is required to define a model. The users are also enabled to validate the models by classifying a set of resources, analyzing the resources that have been classified to a particular class (e.g., violating resources), and specify whether the model is approved for classifying resources.

Figure 1:
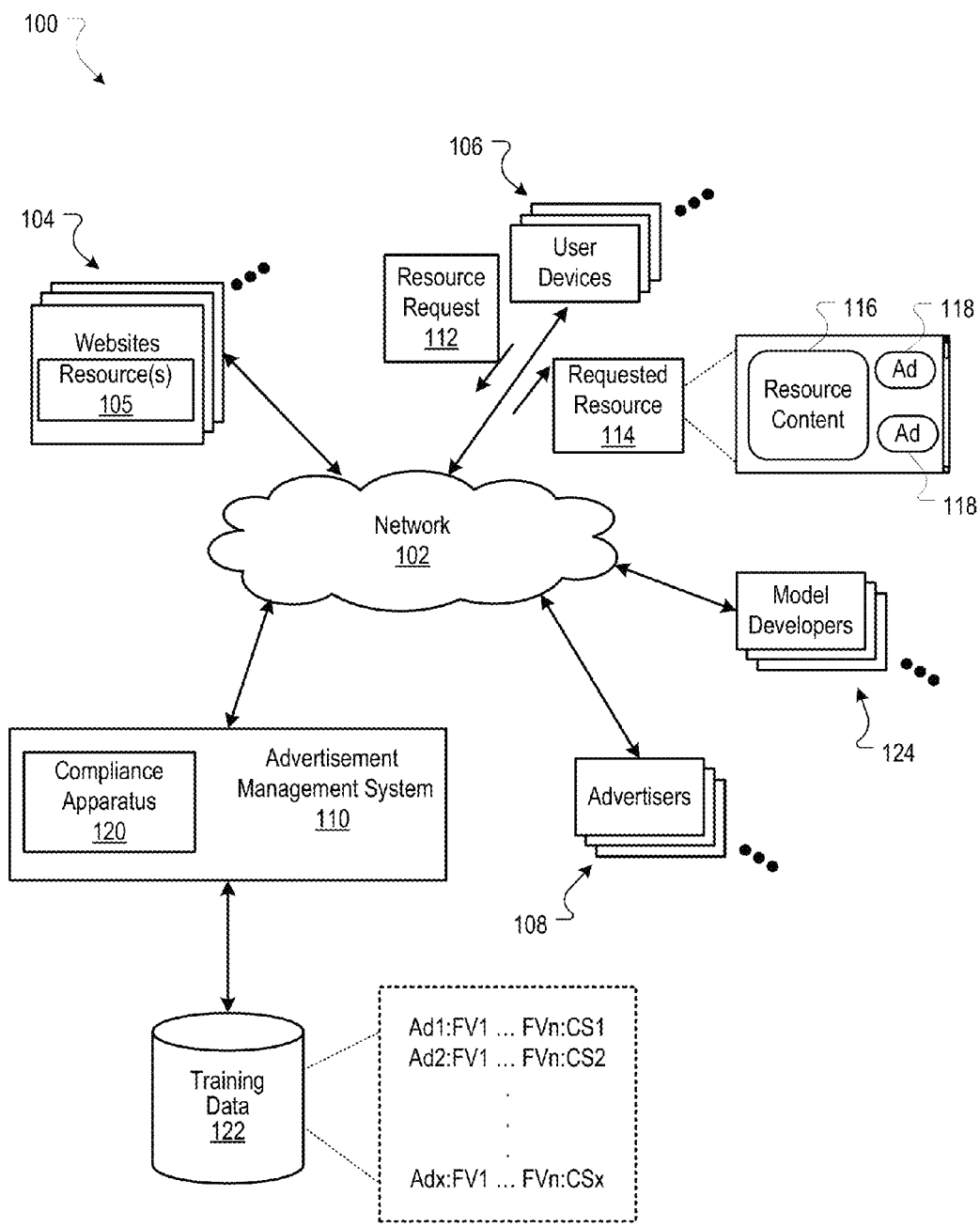
FIG. 1 is a block diagram of an example environment in which an advertisement management system manages advertising services.

FIG. 1 is a block diagram of an example environment 100 in which an advertisement management system 110 manages advertising services. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a search results page in which search results are presented, or another resource 105. The data representing the requested resource 114 can include data that cause presentation of resource content 116 at the user device. The data representing the requested resource 114 can also include data specifying a portion of the resource or a portion of a user display (e.g., a presentation location of a pop-up window or in a portion of a web page) in which advertisements can be presented. These specified portions of the resource or user display are referred to as advertisement slots 118.

When a resource 105 is requested by a user device 106, the advertisement management system 110 receives a request for advertisements to be provided with the requested resource 114. The request for advertisements can include characteristics of the advertisement slots 118 that are defined for the requested resource 114, and can be provided to the advertisement management system 110.

For example, a reference (e.g., URL) to the requested resource 114 for which the advertisement slot is defined, a size of the advertisement slot, and/or media types that are eligible for presentation in the advertisement slot can be provided to the advertisement management system 110. Similarly, keywords associated with a requested resource ("resource keywords") can also be provided to the advertisement management system 110 to facilitate identification of advertisements that are relevant to the requested resource 114.

Based on data included in the request for advertisements, the advertisement management system 110 selects advertisements that are eligible to be provided in response to the request ("eligible advertisements"). For example, eligible advertisements can include advertisements having characteristics matching the characteristics of the advertisement slots 118 and that are identified as relevant to specified resource keywords (e.g., based on clustering techniques, relevance feedback information, cosine similarity measures, or other similarity measures). In some implementations, advertisements having targeting keywords that match the resource keywords are selected as eligible advertisements by the advertisement management system 110.

The eligible advertisements can also be limited to advertisements that have been determined to be in compliance with advertisement distribution guidelines (i.e., complying advertisements) or other content distribution guidelines. Advertisement distribution guidelines are a set of rules with which advertisers are required to comply in exchange for having their advertisements distributed by the advertisement management system 110. The advertisement distribution guidelines may require that advertisements not include explicit content (e.g., adult content, violent content, or other content that are deemed objectionable), that advertisements not promote for sale items that are otherwise available free of charge, that advertisements not promote counterfeit goods, that advertisements not be misleading or fraudulent.

The advertisement management system 110 includes a compliance apparatus 120 that determines whether advertisements (or other content items) are in compliance with the advertisement distribution guidelines. In some implementations, the compliance apparatus 120 trains compliance models using training data 122 that specify advertisement identifiers (Ad1 ... Adx) and feature values (FV1 ... FVn) for the respective advertisements. The feature values for the advertisements are values that specify various characteristics of the advertisements. For example, feature values for advertisements can specify a category or topic to which content of the advertisement is directed, targeting keywords for the advertisement, resource keywords for the landing page to which the advertisement links, sizes of images that are included in the advertisement and/or presented on the landing page, a dwell time measure that characterizes lengths of user visits to the landing page, and/or a quality measure for the landing page.

The training data 122 also include compliance status data (CS1 ... CSx) that specify whether each of the respective advertisements is a complying advertisement (i.e., an advertisement that is in compliance with the advertisements distribution guidelines), a violating advertisement (i.e., an advertisement that is not in compliance with at least one of the advertisements distribution guidelines), or a suspicious advertisement (i.e., an advertisement is classified as not being a complying advertisement and not being a violating advertisement). The compliance status data (CS1 ... CSx) can specify, for a violating advertisement, one or more rules from the advertisement distribution guidelines that are violated by violating advertisement. For example, the compliance status data can specify that a violating advertisement is misleading and/or that a violating advertisement is promoting counterfeit goods.

In some implementations, the compliance status data that are used as training data 122 are only the compliance status data that are associated with (i.e., indexed according to and/or stored with a reference to) manually classified advertisements. When the training data 122 are restricted to compliance status data for manually classified advertisements, the compliance apparatus 120 trains the compliance models using only advertisement classifications that were selected by humans (i.e., subjectively classified advertisements). Thus, the compliance models are trained to represent relationships between subjective human classifications of the advertisements and feature values (FV1 ... FVn) for the advertisements.

The compliance models that are used by the compliance apparatus 120 can also be created and/or modified by model developers 124. A model developer 124 is user that creates, modifies, and/or specifies compliance models that are used by the compliance apparatus 120. Model developers 124 are generally required to provide security credentials (e.g., a user name and password) in order to create and/or provide models for use by the compliance apparatus 120.

In some implementations, a model developer 124 may create a new model to identify a particular type of violating advertisement and/or advertisement landing page (e.g., an advertisement landing page that is offering a particular fraudulent product) that may not otherwise be identified by the other models being used by the compliance apparatus 120. In some implementations, the model developers 124 may adjust existing models that are being used to classify resources. For example, if a particular model has been identified to be classifying a particular type of complying advertisement as a violating advertisement, then a model developer 124 that is responsible for that particular model may modify that particular model to reduce the likelihood that the complying advertisement is classified as a violating advertisement.

The models that are used by the compliance apparatus 120 can be expressed, for example, as a string of advertisement feature values and Boolean operators. Thus, creation and/or modification of these models by model developers 124 can be extremely difficult and/or time consuming such that the models that are created and/or modified by a model developer 124 may include typos or syntax errors that cause model errors and/or result in a model that does not perform as intended.

The compliance apparatus 120 can provide a set of development tools that help model developers create, adjust, and/or manage models that are being used to classify advertisements (or other content items), for example, based on the landing pages (or another resource) to which the advertisements redirect users. As described with reference to FIG. 2, the compliance apparatus 120 provides data that causes presentation of a user interface in which a model developer 124 can interact with user interface elements to create a model rather than having to manually create a string of feature values and Boolean operators that define the model. As described with reference to FIG. 3, the compliance apparatus 120 also facilitates model evaluation by using the model to classify a test set of advertisements (or other resources), and providing the model developer with evaluation data specifying a set of advertisements that were identified as violating advertisements by the model. This model evaluation can be performed prior to model approval, such that the pre-approval classifications are maintained as a separate set of classifications so that advertisement eligibility is not affected by the pre-approval classifications.

Figure 2:
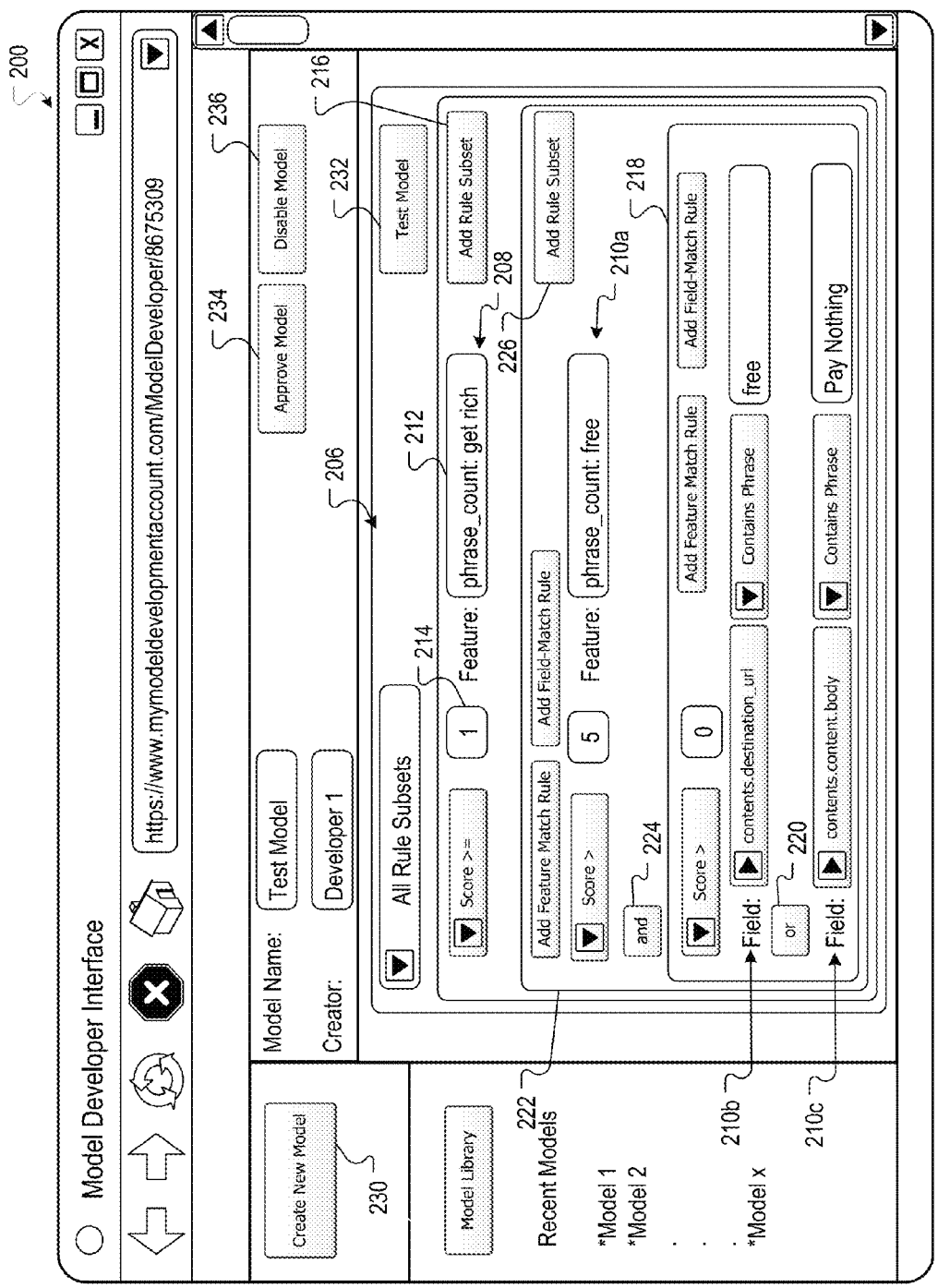
FIG. 2 is a screen shot of an example model development user interface with which a user (e.g., a model developer) can create and manage models.

FIG. 2 is a screen shot of an example model development user interface 200 with which a user (e.g., a model developer) can create and manage models. The user interface 200 includes user interface ("UI") elements that enable a user to request presentation of, and/or modify, existing models. In some implementations, the user interface 200 includes a model library UI element 202 that enables a user to search for an existing model that is stored, for example, in a model data store that stores previously created models. In response to interaction with (e.g., clicking) the model library UI element 202, the user can be provided with a model selection interface that allows the user to select existing models for presentation in a model presentation area 206 of the user interface 200. The user interface 200 can also include a "recent models" UI element 206 that provides a list of recently accessed or created models from which a user can select a model for presentation in the model presentation area 204.

In response to user selecting a model for presentation, a graphical representation of the selected model is presented in the model presentation area 206. The graphical representation of the selected model enables a user to visually identify relationships that exist between model rules that define the model. For example, the graphical representation of the model that is presented in presentation area 206 illustrates that the model has a first model rule 208 and additional model rules 210a, 210b, and 210c. The first model rule 208 specifies a first characteristic 212 of a violating resource and a first threshold score 214 for the first characteristic.

The first characteristic 212 is a characteristic of a resource that has been selected (e.g., by a model training process or a user) as being indicative of a violating resource, and the threshold score 214 specifies a quantity of the first characteristic 212 that must be identified in the resource to satisfy the first rule 208. For example, the threshold score 214 indicates that a resource must include one or more instances of the first characteristic 212 (e.g., the phrase "get rich") in order for the resource to be classified as a violating resource. In some implementations, the first model rule 208 is rule that must be satisfied in order for a resource to be identified as a violating resource. In these implementations, a resource will not be classified as a violating resource, irrespective of any of the additional model rules 210 that are satisfied, unless the first model rule 208 is satisfied.

The user can modify the first model rule 208, for example, by typing a new first characteristic (also referred to as feature value) in the text box for the first characteristic 212, and or adjusting the threshold score 214, for example, by typing a new threshold score in the text box for the threshold score 214. The user can also add rule subsets to the first model rule 208 by interacting with the "add rule subset" UI element 216.

A rule subset is a set of two or more model rules that each specify at least one characteristic and a respective threshold score. For example, the additional model rules 210b and 210c together define rule subset 218. The model rules 210b and 210c that are required to be satisfied by a resource in order for the resource to satisfy the rule subset is specified, for example, by a user selectable relationship UI element 220. In user interface 200, the relationship UI element 220 presents a Boolean "or" operator indicating that either the model rule 210b or the model rule 210c must be satisfied by a resource in order for the resource to satisfy the rule subset 218. Thus, in order to satisfy the rule subset 218, a resource must include the phrase "pay nothing" in the body of the resource or have a URL that includes the phrase "rich."

A rule subset can also be defined by two or more different rule subsets or an individual model rule and a rule subset. For example, the user interface 200 includes a rule subset 222 that includes the model rule 210a and the rule subset 218. The relationship UI element 224 presents a Boolean "and" operator indicating that the rule subset 222 can be satisfied by a resource that satisfies both model rule 210a and rule subset 218. A user can modify the relationship between the model rules, for example, by interacting with (e.g., clicking) the relationship UI element 224. For example, user interaction with the relationship UI element 224 can generate relationship data that are used to modify the model rules that are required to be satisfied in order to classify a resource as a violating resource, as described with reference to FIG. 3.

The description above demonstrates that there are logical relationships between the model rules. These relationships can be visually illustrated to a user, for example, by presenting the model rules at hierarchical presentation positions that are based on the relationships. For example, as noted above, the first model rule 208 is required to be satisfied in order to classify a resource as a violating resource. Thus, the first model rule 208 can be presented at a highest hierarchical position of the model presentation area 206.

Each of the additional model rules 210 can be presented at lower hierarchical presentation positions relative to the first model rule 208 to illustrate the importance of the first model rule relative to the additional model rules 210. Additionally, each additional model rule and/or rule subset that is added to a rule subset (e.g., 218), for example, through user interaction with the "add rule subset" UI element (e.g., 226), can be presented at lower hierarchical presentation positions relative to the position of the rule subset to which the model rule and/or rule subset was added.

To facilitate visualization of the rule subsets and the hierarchical relationships between the model rules and/or rule subsets, the user interface 200 can include subset indicators that visually delineate each rule subset from other rule subsets. For example, the rule subset 222 is outlined by a box that includes the model rule 210a and the rule subset 218. Thus, the model rule 210a and rule subset 218 are visually grouped together by the box for the rule subset 222. The box for the rule subset 222 is also located below the first model rule 208 indicating the relative hierarchical position of the rule subset 222. For example, upon viewing the user interface 200, a user can quickly determine that the rule subset 222 is a sub-rule relative to the first model rule 208. Similarly, the rule subset 218 is visually delineated by a box that surrounds the model rules 210b and 210c, such that the rule subset 218 is visually identified as a sub-rule for each of the rule subset 222 and the first model rule 208.

As noted above, a user can interact with the various user interface elements to modify model rules for existing models, add model rules and/or rule subsets to existing models, and/or change relationships between model rules and/or rule subsets for existing models. Additionally, users can create new models, for example, by interacting with a "create new model" UI element 230. Upon interaction with the "create new model" UI element 230, a default model can be presented in the model presentation area 206. For example, the default model can include a first model rule for which no characteristic or threshold score has been specified, and the user can interact with the user interface elements to specify the first model rule, additional model rules, and/or rule subsets.

Once a user has modified or created a model, the user can test the model by interacting with a "test model" UI element 232. In some implementations, user interaction with the "test model" UI element causes submission of a model validation request that requests classification of a set of resources. For example, a set of resources can be classified using the model, and a list of the resources that were identified as violating resources can be provided back to the user (e.g., in a user interface, or in an electronic message). The user can review the resources that were classified as violating resources, adjust the model as described above, and again test the model. The user can iteratively adjust and test the model until the user is satisfied that the model is correctly classifying the resources, and then approve the model for classifying resources, for example, by interacting with an "approve model" UI element 234. In response to user interaction with the "approve model" UI element 234 approval data can be generated and submitted indicating that the user has approved the model. At any time the user can also disable a model by interacting with a "disable model" UI element 236. Upon interaction with the "disable model" UI element 236, disable data are generated indicating that the model is no longer to be used to classify resources.

Figure 3:
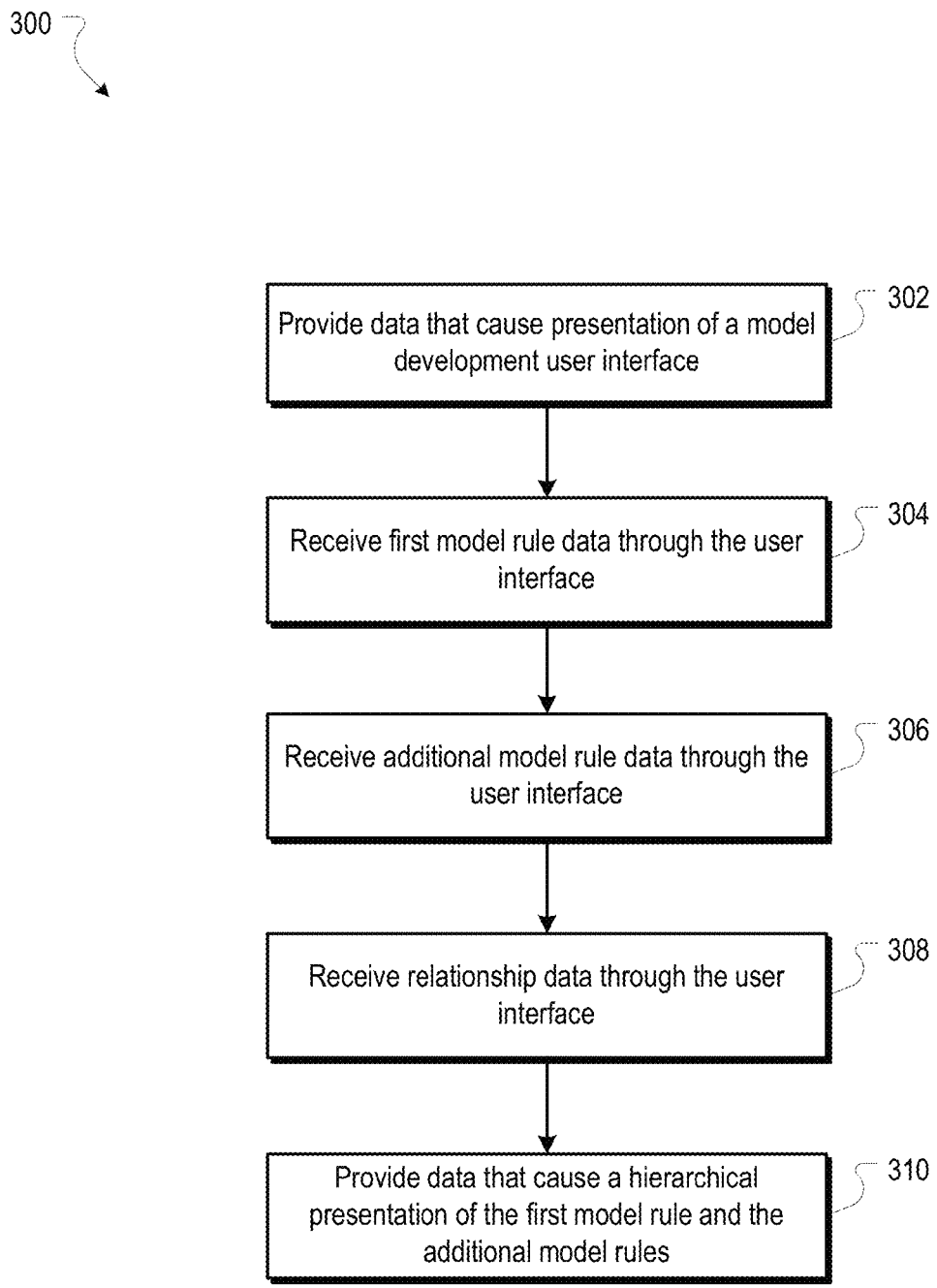
FIG. 3 is a flow chart of an example process for facilitating model development.

FIG. 3 is a flow chart of an example process 300 for facilitating model development. The process 300 is a process by which a data processing apparatus (e.g., the compliance apparatus 120 of FIG. 1) provides data that cause presentation of a model development user interface. Model rule data are received through the user interface, for example, in response to a user interacting with user interface elements of the model development user interface. The model rule data specifying characteristics of violating resources and threshold scores for the specified characteristics. Relationship data are also received by the data processing apparatus. The relationship data specify sets of the model rules that violating resources satisfy. The data processing apparatus processes the received model rule data and the relationship data, and provides data that cause a hierarchical presentation of the model rules, where the hierarchy of the model rules is based on the relationship data.

The process 300 can be implemented, for example, using the compliance apparatus 120 and/or advertisement management system 110 of FIG. 1. The process 300 can also be implemented as instructions stored on computer storage medium such that execution of the instructions by data processing apparatus cause the data processing apparatus to perform the operations of the process 300.

Data that cause presentation of a model development user interface are provided to a user device (302). In some implementations, the data that cause presentation can be provided upon request from the user device. For example, a request for a network location at which the user interface is accessible can be received from the user device, and the data that cause presentation of the user interface can be provided in response to the request. In some implementations, access to the model development user interface can be restricted to authorized users. For example, users can be required to provide a valid user name and password in order to access the model development user interface. As described in detail with reference to FIG. 2, the model development user interface can include user interface elements that enable a user to create, edit, and/or manage one or more models.

First model rule data are received through the user interface (304). In some implementations, the first model rule data specify a first model rule that is used to classify resources as violating or complying (i.e., non-violating) resources. The first model rule can specify, for example, a first characteristic of a violating resource and a threshold score for the first characteristic. The first characteristic of the violating resource is a characteristic of a resource that has been selected as indicative of the resource being in violation of distribution guidelines. For example, statistical analysis of violating web pages may reveal that 80% of the violating web pages include at least 5 instances of the phrase "free," while fewer than 10% of non-violating web pages include at least 5 instances of the phrase "free." Thus, the inclusion of the phrase "free" in a web page may be specified as a characteristic with which a violating resource can be identified.

The threshold score for the first characteristic is a value that is used to specify a relative prevalence with which a particular feature exists in a violating resource. In some implementations, the threshold score for the first characteristic specifies a quantity of instances with which the first characteristic must be identified in the resource in order for the resource to satisfy the first model rule. Continuing with the example above, it may be determined that identifying 5 instances of the phrase "free" in a resource is sufficiently informative for determining whether a resource is a violating resource. In this example, the threshold score for the first characteristic can be set to 5 (or a value proportional to 5 if each instance of the phrase "free" is attributed a value other than 1), indicating that a violating resource will have at least 5 instances of the phrase "free."

In some implementations, the first model rule can specify two or more characteristics that each has a respective threshold score. Each characteristic in the first model rule can be associated with a Boolean operator that specifies a relationship of the characteristic with other characteristics that are included in the first model rule. For example, the user can interact with a user interface element that enables the user to specify whether each of the characteristics is a required characteristic (e.g., by selecting an "and" Boolean operator) or an alternative characteristic (e.g., by selecting an "or" Boolean operator). As described with respect to FIG. 2, each of the characteristics can also be specified on a per-resource basis and/or on a per-field basis. Continuing with the example above, the user can specify that the instances of the phrase "free" that are indicative of a violating resource can occur anywhere in the resource (i.e., "free" can be specified on a per-resource basis), or the user can specify that the instances of the phrase "free" must be identified in one or more specified fields (e.g., in the title or body of the resource."

Additional model rule data are received through the user interface (306). In some implementations, the additional model rule data specify one or more additional model rules that are used to classify resources as violating or complying resources. Each of the additional model rules can specify, for example, an additional characteristic of a violating resource (i.e., relative to the first characteristic that is specified by the first model rule) and an additional threshold each additional characteristic. For example, the user can specify that in addition to including at least 5 instances of the phrase "free," the body of violating resources also include at least one instance of the phrase "send no money now" or the phrase "get rich." In this example, the user can interact with user interface elements of the model development user interface, as described with reference to FIG. 2, to specify these additional characteristics of violating resources, which in turn causes additional model rule data to be submitted through the user interface.

The additional model rule data that are received also include a threshold score for each of the additional characteristics that are specified by the additional model rule data. Continuing with the example above, if only one instance of the phrase "send no money now" or "get rich" is to be required to be identified in the body of the resource, the threshold value for each of these additional characteristics can be set to 0, such that identification of a single instance of either characteristic will satisfy (i.e., meet or exceed) the threshold value. Example resource characteristics are described for purposes of example, but other resource characteristics, such as network locations of resources and formatting characteristics can be specified by the additional model rule data.

Relationship data for each of the additional model rules are received through the user interface (308). The relationship data specify sets of the additional model rules that violating resources satisfy. In some implementations, the relationship data are received in response to user interaction with a user interface element that enables user selection of logical relationships between characteristics. As described with reference to FIG. 2, the user can interact with a user interface element that enables the user to select a Boolean operator that specifies whether all of the additional model rules are required to be satisfied (e.g., through selection of an "and" operator for the additional model rules), or whether satisfaction of only one of the additional rules is sufficient (e.g., through selection of an "or" operator for the additional model rules). Continuing with the example above, when an "and" operator is specified by the relationship data for the phrase "send no money now" and "get rich," a resource would need to include both of these phrases in order for the resource to satisfy the set of additional model rules in this example. However, if the relationship data specified an "or" operator, a resource that included either one of the phrases "send no money now" or "get rich" would satisfy a set of the additional model rules in this example.

In some implementations, the additional model rule data can further specify one or more different rule subsets that each includes two or more different additional model rules. For example, the additional model rule data can specify that the phrases "send no money" and "get rich" belong to one rule subset, while another rule subset can include additional features and threshold scores. The other rule subset may specify, for example, that a violating resource includes the phrase "exquisite jewelers" or "below cost." This other rule subset may be satisfied by a resource independent of whether the example rule subset above (i.e., the subset including the phrase "get rich"), is satisfied by the resource. The additional model rule data that specify the other rule subset can be received in response to the user interacting with a user interface element that request creation of a "rule subset" and specifying the additional model rules that are to be included in the rule subset, as described with reference to FIG. 2.

When two or more different rule subsets exist for a particular first model rule, the relationship data that are received can specify, for each rule subset, sets of the model rules within the rule subset that are satisfied by violating resources. For example, as described above, the relationship data can specify whether every additional rule within a rule subset is required to be satisfied for the rule subset to be satisfied (i.e., all of the additional rules in the subset have an "and" relationship), or whether satisfaction of any of the additional rules in the subset is sufficient for satisfaction of the rule subset (i.e., all of the additional rules in the subset have an "or" relationship). More complex relationships can be specified for each subset, for example, such that a portion of the additional rules in a particular subset have an "or" relationship with another portion of the additional rules that have an "and" relationship.

Data that cause a hierarchical presentation of the first model rule and the additional model rules are provided (310). The first model rule is presented at a highest hierarchical presentation position, and each of the additional models rules is presented at a descendent hierarchical position. In some implementations, the hierarchical position at which a particular additional model rule is presented is based on the relationship data. For example, when multiple different rule subsets have been defined, each additional rule that is included in a particular rule subset will be presented at a same hierarchical level as the other additional rules that are included in the same particular rule subsets, as illustrated by FIG. 2.

In some implementations, when satisfaction of a particular model rule, or rule subset, is conditioned on satisfaction of an additional model rule, or another rule subset, the additional model rule (or rule subset) upon which satisfaction of the particular model rule (or rule subset) is conditioned is defined as a descendent of the particular model rule. The data that cause the hierarchical presentation can further cause presentation of the addition model rule at a descendent hierarchical position relative to the particular model rule, such that the rule dependencies are visually provided to the user through the hierarchical presentation.

In some implementations, the data that cause the hierarchical presentation of the first model rule and the additional model rules, further cause presentation of a relationship indicator for each of the additional model rules. For example, a user interface element can specify whether, in addition to satisfaction of the first model rule, all of the additional model rules must be satisfied in order to classify a resource as a violating resource, or whether satisfaction of one additional model rule, or another proper subset of additional model rules is sufficient to classify a resource as a violating resource.

When multiple rule subsets have been defined, the data that cause the hierarchical presentation further cause presentation of subset indicators that visually delineate each rule subset from other rule subsets. For example, as described with reference to FIG. 2, the additional model rules that are included in a particular rule subset can be presented within a "subset box," or another indication that the additional rules each belong to the rule subset. Additionally, rule subsets that are defined within another rule subset can be visually distinguished using similar subset indicators.

In some implementations, the data that cause presentation of the hierarchical presentation further cause presentation of a user interface element that specifies whether classification of a resource as a violating resource requires satisfaction of all rule subsets, or only a proper subset of the rule subsets (e.g., through presentation of Boolean operators next to the rule subsets). The data can also cause presentation of user interface elements that specify whether additional rules that are included in a particular rule subset are all required to be satisfied for satisfaction of the rule subset (i.e., the additional rules have an "and" relationship), or whether satisfaction of any of the additional rules in the particular subset is sufficient to satisfy the particular rule subset (i.e., the additional rules have an "or" relationship). Thus, the relationship indicator specifies the sets and/or combinations of additional rules that must be satisfied to classify a resource as a violating resource.

Once the model has been created and/or presented at a user device, a model evaluation request that requests classification of a set of resources with the model can be received through the model development user interface, as described below with reference to FIG. 4. In response to the request, the set of resources can be classified and data that cause presentation of a list of the resources that were classified as violating resources can be provided to the user device. In turn, approval data specifying that the model has been approved to classify resources can be received through the user interface, and the model can be used to classify resources. Alternatively, if approval data are not received the model will not be used to classify resources.

Figure 4:
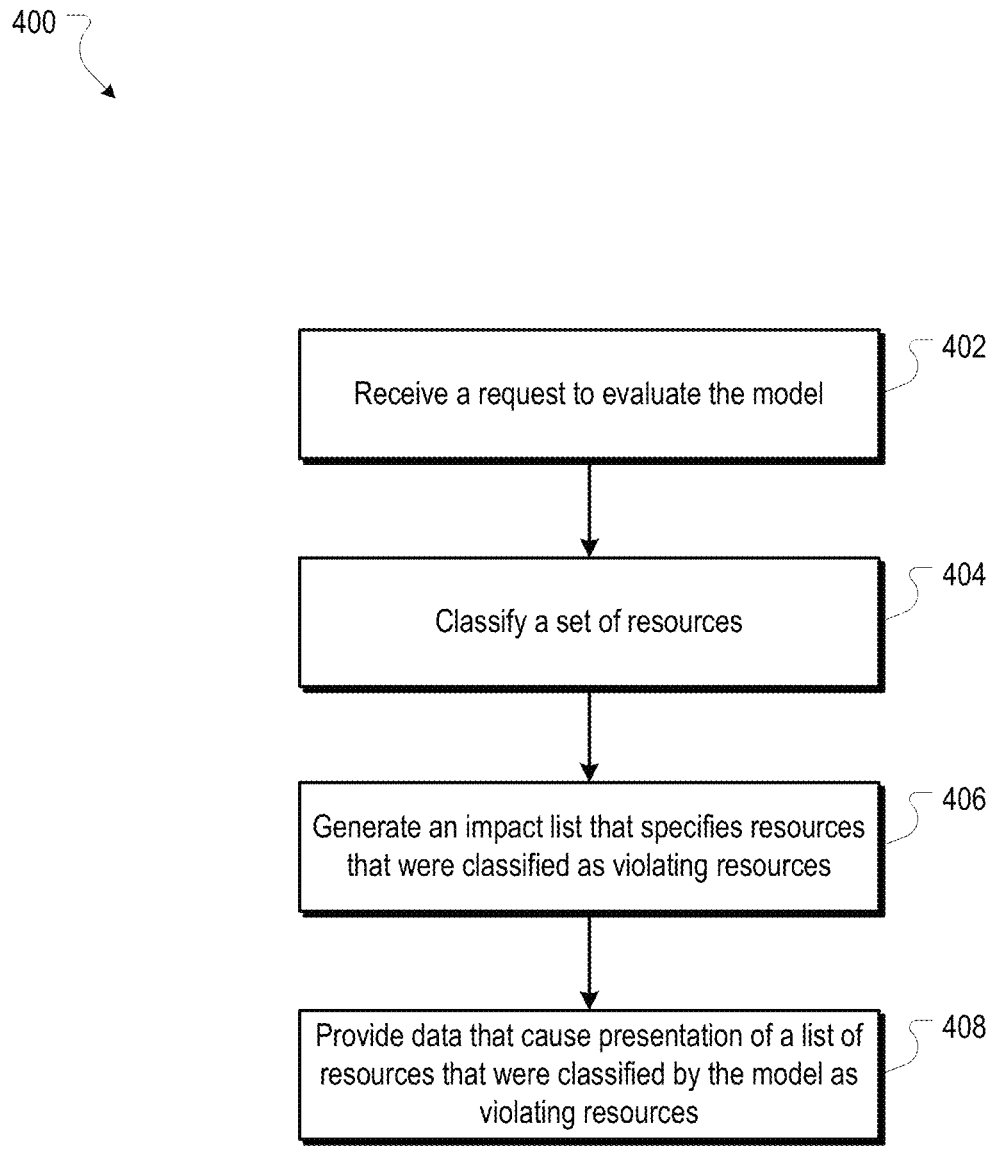
FIG. 4 is an example process for evaluating a model.

FIG. 4 is an example process 400 for evaluating a model that was created, for example, according to the process 300. The process 400 can be implemented, for example, using the compliance apparatus 120 and/or advertisement management system 110 of FIG. 1. The process 400 can also be implemented as instructions stored on computer storage medium such that execution of the instructions by data processing apparatus cause the data processing apparatus to perform the operations of the process 400.

A model evaluation request that requests classification of a set of resources with the model is received through the user interface (402). In some implementations, the model evaluation request is received in response to user interaction with a model development interface similar to that described with reference to FIG. 2. The model evaluation request can request that the model be used to classify resources without affecting the eligibility of content items (e.g., advertisements) that redirect users to (e.g., are linked to) the resources that are classified.

In response to receiving the model evaluation request, the set of resources is classified using the model (404). In some implementations, the classifications of the resources in response to the request are used for purposes of model evaluation, and do not affect the eligibility of content items (e.g., advertisements) that redirect users to the resource. In some implementations, each resource is classified based whether a cumulative score for the resource exceeds a maximum cumulative score for non-violating resources that was specified by the first model rule data. The cumulative score for the resource can be determined based on the set of additional rules that is satisfied by the resource. For example, each additional model rule (or rule subset) that is satisfied by the resource contribute to the cumulative score, either a score of "1," indicating that the additional model rule was satisfied, or the total score from the additional model rule (or rule subset). For example, if a resource included 6 instances of the phrase "free," satisfaction of an additional rule that required at least 5 instances of the phrase "free" could result in addition of a score of "1," or alternatively, a score of "6" to the cumulative score. Computation of the cumulative score for a resource can generally begin at the model rule having the lowest hierarchical presentation position, and continue with the model rules that are at higher hierarchical presentation positions.

An impact list that specifies resources from the set of resources that were classified by the model as violating resources is generated (406). In some implementations, the impact list can specify network locations (e.g., uniform resource locators) from which the resources are accessible and/or a title of the resource.

Data that cause presentation of resource identifiers for the resources that were classified as violating resources are provided (408). In some implementations, the data cause presentation of the network locations from which the resources are accessible and/or titles of the resources. The data can be provided, for example, to cause presentation of the resource identifiers at the user device and/or within the model development user interface.

Receive approval data through the user interface (410). In some implementations, the approval data specify that the model has been approved to classify resources as violating or complying resources. The approval data can be received, for example, in response to user interaction with a user interface element that causes submission of the approval data. The user interface element that causes submission of the approval data can be included in the model development user interface.

Figure 5:
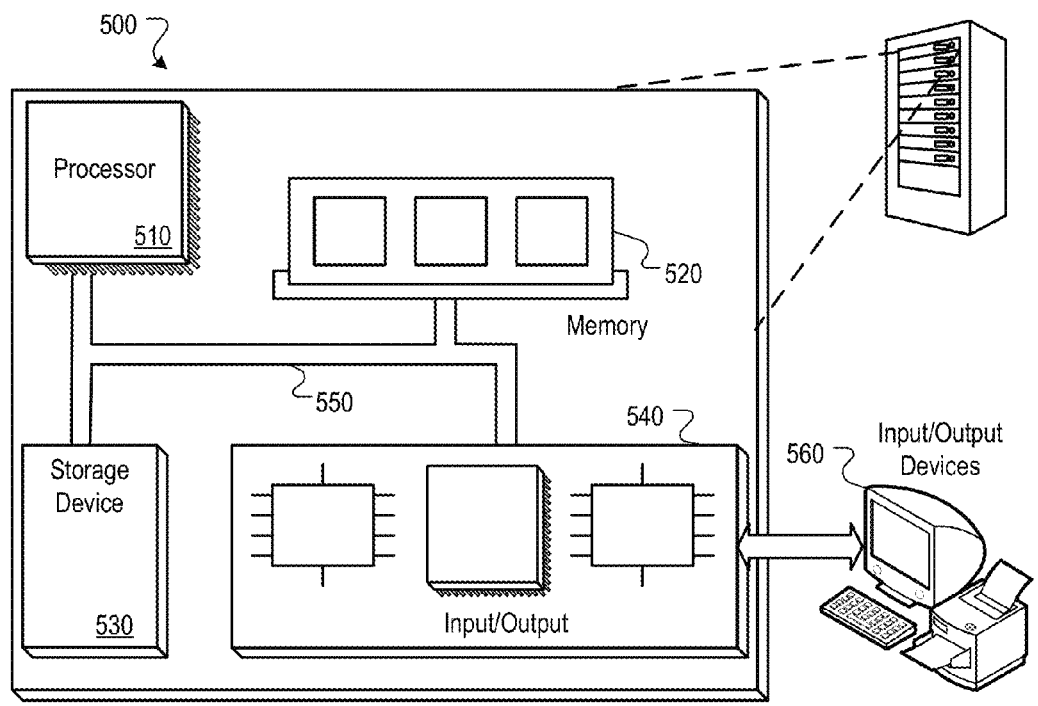
FIG. 5 is block diagram of an example computer system that can be used to create, modify, or evaluate decision models Like reference numbers and designations in the various drawings indicate like elements.

FIG. 5 is block diagram of an example computer system 500 that can be used to create, modify, or evaluate decision models, as described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
providing data that cause presentation of a model development user interface;
receiving first model rule data through the user interface, the first model rule data specifying a first model rule that specifies a first characteristic of a violating resource and a threshold score for the first characteristic, wherein the first model rule data specifies a phrase and a threshold number of instances of the phrase that, when included in resource, are indicative of the resource being a violating resource;
receiving additional model rule data through the user interface, the additional model rule data specifying one or more additional model rules, each of the additional model rules specifying an additional characteristic of the violating resource and an additional threshold for the additional characteristic;
receiving, for each of the additional model rules, relationship data through the user interface, the relationship data specifying sets of the additional model rules that violating resources satisfy; and
providing data that cause a hierarchical presentation of the first model rule and the additional model rules, the first model rule being presented at a highest hierarchical position and each of the additional model rules being presented at a descendent hierarchical position based on the relationship data, the data further causing presentation of a relationship indicator for each of the additional model rules, the relationship indicator specifying the sets of additional model rules that must be satisfied to classify a resource as a violating resource.

2. The method of claim 1, wherein:
receiving additional model rule data comprises receiving additional model rule data that specify one or more rule subsets that each include two or more different model rules;
receiving relationship data comprises receiving, for each rule subset, relationship data specifying a set of the two or more different model rules in the rule subset that are satisfied by the violating resource; and
providing data that cause presentation of the first model rule and the additional model rules comprises providing data that cause presentation of each rule subset and a relationship indicator for the model rules in the rule subset, the relationship indicator specifying combinations of the model rules in the rule subset that must be satisfied to classify a resource as a violating resource.

3. The method of claim 2, wherein providing data that cause presentation of each rule subset comprises providing data that cause presentation of a subset indicator that visually delineates each rule subset from other rule subsets.

4. The method of claim 2, wherein providing data that cause presentation of each rule subset comprises, for each rule subset, providing data that cause presentation of the rule subset at a hierarchical presentation position that indicates hierarchical relationships between the rule subset and other rule subsets, satisfaction of each rule subset being based, in part, on satisfaction of one or more other rule subsets that are hierarchical descendants of the rule subset.

5. The method of claim 1, wherein receiving additional model rule data comprises receiving additional model rule data that specify a network location for a resource.

6. The method of claim 1, further comprising:
receiving a model evaluation request requesting that a model that is defined by the first model rule and the additional model rules be used to classify a set of resources;
in response to receiving the model evaluation request, classifying the set of resources;
generating an impact list that specifies resources from the set of resources that were classified by the model as violating resources; and
providing data that cause presentation of resource identifiers for the resources that were classified as violating resources.

7. The method of claim 6, further comprising receiving approval data through the user interface, the approval data specifying that the model has been approved to classify resources.

8. The method of claim 1, wherein receiving first model rule data that specify a threshold score for the first characteristic further comprises receiving a cumulative rule score that specifies a maximum cumulative score of a non-violating resource, the cumulative for a resource being determined based on the set of the additional model rules that is met by the resource.

9. A non-transitory computer storage medium encoded with a computer program, the program comprising instructions that when executed by data processing apparatus cause the data processing apparatus to perform operations comprising:
providing data that cause presentation of a model development user interface;
receiving first model rule data through the user interface, the first model rule data specifying a first model rule that specifies a first characteristic of a violating resource and a threshold score for the first characteristic, wherein the first model rule data specifies a phrase and a threshold number of instances of the phrase that, when included in resource, are indicative of the resource being a violating resource;
receiving additional model rule data through the user interface, the additional model rule data specifying one or more additional model rules, each of the additional model rules specifying an additional characteristic of the violating resource and an additional threshold for the additional characteristic;
receiving, for each of the additional model rules, relationship data through the user interface, the relationship data specifying sets of the additional model rules that violating resources satisfy; and
providing data that cause a hierarchical presentation of the first model rule and the additional model rules, the first model rule being presented at a highest hierarchical position and each of the additional model rules being presented at a descendent hierarchical position based on the relationship data, the data further causing presentation of a relationship indicator for each of the additional model rules, the relationship indicator specifying the sets of additional model rules that must be satisfied to classify a resource as a violating resource.

10. The non-transitory computer storage medium of claim 9, wherein, upon execution of the instructions, the instructions further cause the data processing apparatus to perform operations comprising:
  receiving a model evaluation request requesting that a model that is defined by the first model rule and the additional model rules be used to classify a set of resources;
  in response to receiving the model evaluation request, classifying the set of resources;
  generating an impact list that specifies resources from the set of resources that were classified by the model as violating resources; and
  providing data that cause presentation of resource identifiers for the resources that were classified as violating resources.

11. A system comprising:
  a user device; and
  one or more computers operable to interact with the user device, the one or more computers being further operable to perform operations including:
    providing data that cause presentation of a model development user interface;
    receiving first model rule data through the user interface, the first model rule data specifying a first model rule that specifies a first characteristic of a violating resource and a threshold score for the first characteristic, wherein the first model rule data specifies a phrase and a threshold number of instances of the phrase that, when included in resource, are indicative of the resource being a violating resource;
    receiving additional model rule data through the user interface, the additional model rule data specifying one or more additional model rules, each of the additional model rules specifying an additional characteristic of the violating resource and an additional threshold for the additional characteristic;
    receiving, for each of the additional model rules, relationship data through the user interface, the relationship data specifying sets of the additional model rules that violating resources satisfy; and
    providing data that cause a hierarchical presentation of the first model rule and the additional model rules, the first model rule being presented at a highest hierarchical position and each of the additional model rules being presented at a descendent hierarchical position based on the relationship data, the data further causing presentation of a relationship indicator for each of the additional model rules, the relationship indicator specifying the sets of additional model rules that must be satisfied to classify a resource as a violating resource.

12. The system of claim 11, wherein the one or more computers are further operable to perform operations including:
  receiving additional model rule data that specify one or more rule subsets that each include two or more different model rules;
  receiving, for each rule subset, relationship data specifying a set of the two or more different model rules in the rule subset that are satisfied by the violating resource; and
  providing data that cause presentation of each rule subset and a relationship indicator for the model rules in the rule subset, the relationship indicator specifying combinations of the model rules in the rule subset that must be satisfied to classify a resource as a violating resource.

13. The system of claim 12, wherein the one or more computers are further operable to perform operations including providing data that cause presentation of a subset indicator that visually delineates each rule subset from other rule subsets.

14. The system of claim 12, wherein the one or more computers are further operable to perform operations including providing, for each rule subset, data that cause presentation of the rule subset at a hierarchical presentation position that indicates hierarchical relationships between the rule subset and other rule subsets, satisfaction of each rule subset being based, in part, on satisfaction of one or more other rule subsets that are hierarchical descendants of the rule subset.

15. The system of claim 11, wherein the one or more computers are further operable to perform operations including receiving additional model rule data that specify a network location for a resource.

16. The system of claim 11, wherein the one or more computers are further operable to perform operations including:
  receiving a model evaluation request requesting that a model that is defined by the first model rule and the additional model rules be used to classify a set of resources;
  in response to receiving the model evaluation request, classifying the set of resources;
  generating an impact list that specifies resources from the set of resources that were classified by the model as violating resources; and
  providing data that cause presentation of resource identifiers for the resources that were classified as violating resources.

17. The system of claim 16, wherein the one or more computers are further operable to perform operations including receiving approval data through the user interface, the approval data specifying that the model has been approved to classify resources.

18. The system of claim 11, wherein the one or more computers are further operable to perform operations including receiving a cumulative rule score that specifies a maximum cumulative score of a non-violating resource, the cumulative for a resource being determined based on the set of the additional model rules that is met by the resource.

* * * * *